(12) United States Patent
Miyamoto et al.

(10) Patent No.: US 11,322,921 B2
(45) Date of Patent: May 3, 2022

(54) ELECTRICAL JUNCTION BOX

(71) Applicant: SUMITOMO WIRING SYSTEMS, LTD., Mie (JP)

(72) Inventors: Yuji Miyamoto, Mie (JP); Kohei Suzuki, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 17/021,301

(22) Filed: Sep. 15, 2020

(65) Prior Publication Data
US 2021/0091549 A1    Mar. 25, 2021

(30) Foreign Application Priority Data
Sep. 25, 2019   (JP) .............................. JP2019-174195

(51) Int. Cl.
*H02G 3/08* (2006.01)
*B60R 16/023* (2006.01)

(52) U.S. Cl.
CPC .......... *H02G 3/081* (2013.01); *B60R 16/0238* (2013.01); *H02G 3/088* (2013.01)

(58) Field of Classification Search
CPC .......... H02G 3/08; H02G 3/081; H02G 3/088; H02G 3/14; H02G 3/083; H02G 3/16; H02G 3/086; H05K 5/00; H05K 5/02; H05K 5/0004; H05K 5/0091; H05K 5/0217; H05K 5/0204; B60R 16/02; B60R 16/0239; B60R 16/00; B60R 16/0238; H01R 9/2458; H01R 2201/26; H01R 9/24

USPC .......... 174/50, 520, 17 R; 220/3.2–3.8, 4.02; 439/76.1, 76.2; 361/600, 601, 622, 641, 361/837, 605
See application file for complete search history.

(56) References Cited

U.S. PATENT DOCUMENTS

| | | | | |
|---|---|---|---|---|
| 6,108,202 A | * | 8/2000 | Sumida | .................. H05K 7/026 361/690 |
| 8,426,737 B2 | * | 4/2013 | Maebashi | ........... B60R 16/0238 174/152 R |
| 8,785,775 B2 | * | 7/2014 | Takeuchi | ............... H02G 3/088 174/67 |
| 8,941,009 B2 | * | 1/2015 | Makino | ................... B60R 16/02 174/50 |

(Continued)

FOREIGN PATENT DOCUMENTS

JP     2007-068274 A     3/2007

*Primary Examiner* — Angel R Estrada
(74) *Attorney, Agent, or Firm* — Abelman, Frayne & Schwab

(57) ABSTRACT

An electrical junction box includes a box body, a housing member fixed to a fixing surface that is set on a portion of an inner surface of the box body, and an electronic component that is housed in the housing member and to which a wire W is to be connected. The housing member includes a wire lead-out surface from which the wire W connected to the electronic component is to be led out, a component housing portion that is a space for housing the electronic component and that includes an opening portion that opens in the wire lead-out surface, and an extended wall portion that is located on the fixing surface side relative to the component housing portion and extends to a side of the opening portion in an opening direction thereof relative to the wire lead-out surface.

10 Claims, 3 Drawing Sheets

(56) References Cited

U.S. PATENT DOCUMENTS

| | | | | |
|---|---|---|---|---|
| 8,969,723 B2* | 3/2015 | Hirasawa | ............... | H02G 3/088 |
| | | | | 174/50 |
| 9,000,297 B2* | 4/2015 | Makino | ................ | H05K 5/0208 |
| | | | | 174/50 |
| 11,038,330 B2* | 6/2021 | Kurata | ................ | B60R 16/0238 |

* cited by examiner

ELECTRICAL JUNCTION BOX

CROSS-REFERENCE TO RELATED APPLICATIONS

This application is based on and claims priority from Japanese Patent Application No. 2019-174195, filed on Sep. 25, 2019, with the Japan Patent Office, the disclosure of which is incorporated herein in their entireties by reference.

TECHNICAL FIELD

The present disclosure relates to an electrical junction box.

BACKGROUND

As disclosed in Japanese Patent Laid-open Publication No. 2007-068274, for example, an electrical junction box in which a plurality of electronic components such as a fuse and a relay are integrated is used in vehicles for the purpose of improving the efficiency and maintainability of electrical wiring. The electrical junction box is disposed between a power source and various kinds of the electrical equipment, and supplies power from the power source to the electrical equipment.

SUMMARY

In an electrical junction box such as described above, a technical problem lies in a method for inhibiting water from contacting the electronic components disposed therein.

In view of this, an object of the present invention is to provide an electrical junction box that can inhibit water from contacting electronic components disposed therein.

An electrical junction box according to the present disclosure includes a box body, a housing member fixed to a fixing surface that is set on a portion of an inner surface of the box body, and an electronic component that is housed in the housing member and to which a wire is to be connected, and the housing member includes a wire lead-out surface from which the wire connected to the electronic component is to be led out, a component housing portion that is a space for housing the electronic component and that includes an opening portion that opens in the wire lead-out surface, and an extended wall portion that is located on the fixing surface side relative to the component housing portion and extends to a side of the opening portion in an opening direction thereof relative to the wire lead-out surface.

According to the present disclosure, it is possible to provide an electrical junction box that can inhibit water from contacting electronic components disposed therein.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
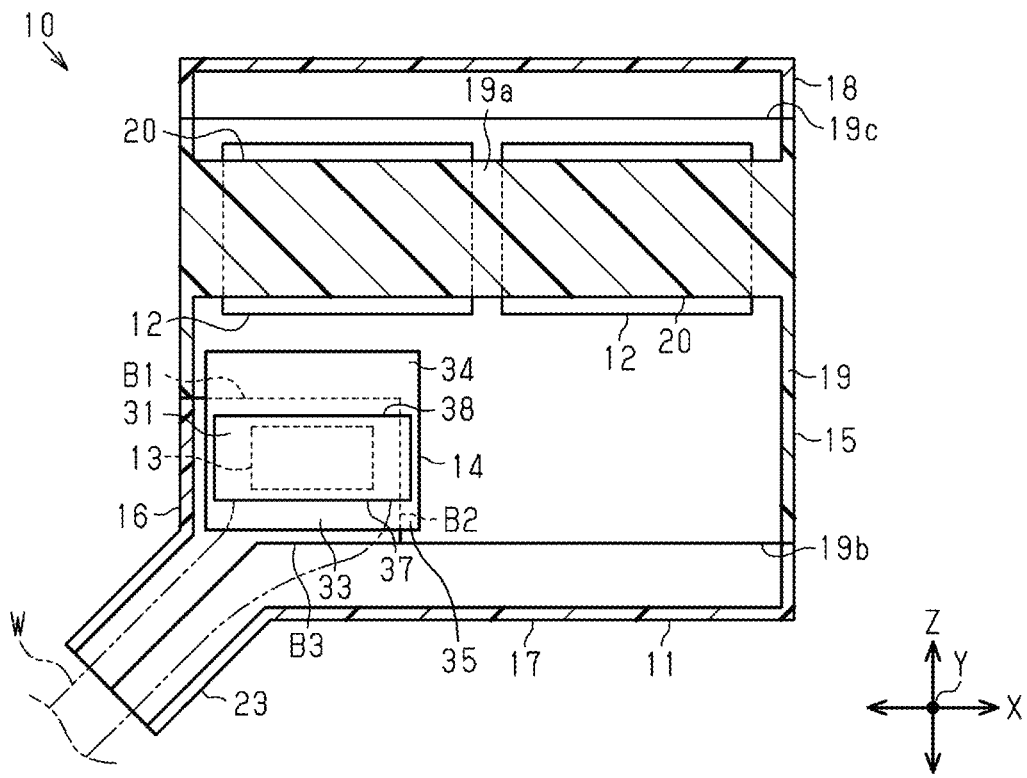
FIG. 1 is a schematic cross-sectional view of an electrical junction box according to an embodiment seen from a side.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Description of Embodiments of the Present Disclosure

First, embodiments of the present disclosure will be listed and illustrated.

(1) An electrical junction box according to the present disclosure includes a box body, a housing member fixed to a fixing surface that is set on a portion of an inner surface of the box body, and an electronic component that is housed in the housing member and to which a wire is to be connected, and the housing member includes a wire lead-out surface from which the wire connected to the electronic component is to be led out, a component housing portion that is a space for housing the electronic component and that includes an opening portion that opens in the wire lead-out surface, and an extended wall portion that is located on the fixing surface side relative to the component housing portion and extends to a side of the opening portion in an opening direction thereof relative to the wire lead-out surface.

With this configuration, the extended wall portion makes it possible to inhibit water that has penetrated into the box body from penetrating into the component housing portion of the housing member, through the opening portion on the wire lead-out surface side. Accordingly, it is possible to inhibit water from contacting the electronic components housed in the component housing portion of the housing member.

(2) It is preferable that the extended wall portion of the housing member is a first extended wall portion, the opening portion of the component housing portion is a first opening portion, the component housing portion includes a second opening portion that opens in a side surface that is on the opposite side to the wire lead-out surface of the housing member, and the housing member is provided with a second extended wall portion that is located on the fixing surface side relative to the component housing portion and extends to a side of the second opening portion in an opening direction thereof relative to the side surface.

With this configuration, the second extended wall portion makes it possible to inhibit water that has penetrated into the box body from penetrating into the component housing portion of the housing member, through the second opening portion. Accordingly, also in a configuration in which the component housing portion also opens on the opposite side to the wire lead-out face, it is possible to inhibit water from contacting the electronic components housed in the component housing portion of the housing member.

(3) It is preferable that an outer frame of the box body is constituted of a plurality of divided bodies, and at least one of the first extended wall portion and the second extended wall portion overlaps a boundary between the divided bodies.

With this configuration, it is possible to favorably inhibit water that has penetrated into the box body through the boundary between the divided bodies from penetrating into the component housing portion, and as a result, it is possible to favorably inhibit water from contacting the electronic components housed in the component housing portion.

(4) It is preferable that the housing member is provided with a side extended wall portion that is located on the fixing surface side relative to the component housing portion and extends outward relative to the outer surface of the housing member in a direction that is along the fixing surface and orthogonal to the opening direction of the opening portion on the wire lead-out surface side. With this configuration, the side extended wall portion makes it possible to inhibit water from contacting the electronic components housed in the component housing portion more favorably.

(5) It is preferable that the electronic component housed in the housing member is a first electronic component, and the electrical junction box includes a second electronic component housed in a second component housing portion that is different from the component housing portion in the box body, and the housing member and the second component housing portion oppose each other in a direction along an opening direction of the second component housing portion.

With this configuration, compared to the case in which the housing member and the second component housing portion are arranged side by side in a planar direction orthogonal to the opening direction of the second component housing portion, the size of the box body in the planar direction can be reduced. In this manner, it is possible to increase the number of electronic components to be installed while suppressing an increase in size of the box body in the planar direction.

Detailed Embodiments of the Present Disclosure

Hereinafter, specific examples of the electrical junction box according to the present disclosure will be described with reference to the drawings. Note that the present invention is not limited to these illustrative examples and is defined by the claims, and all changes which come within the meaning and range of equivalency of the claims are intended to be embraced therein. In the drawings, an X-axis out of XYZ-axes that are orthogonal to each other indicates a front-rear direction X of an electrical junction box 10, a Y-axis indicates a width direction Y of the electrical junction box 10, and a Z-axis indicates a height direction Z of the electrical junction box 10.

Figure 2:
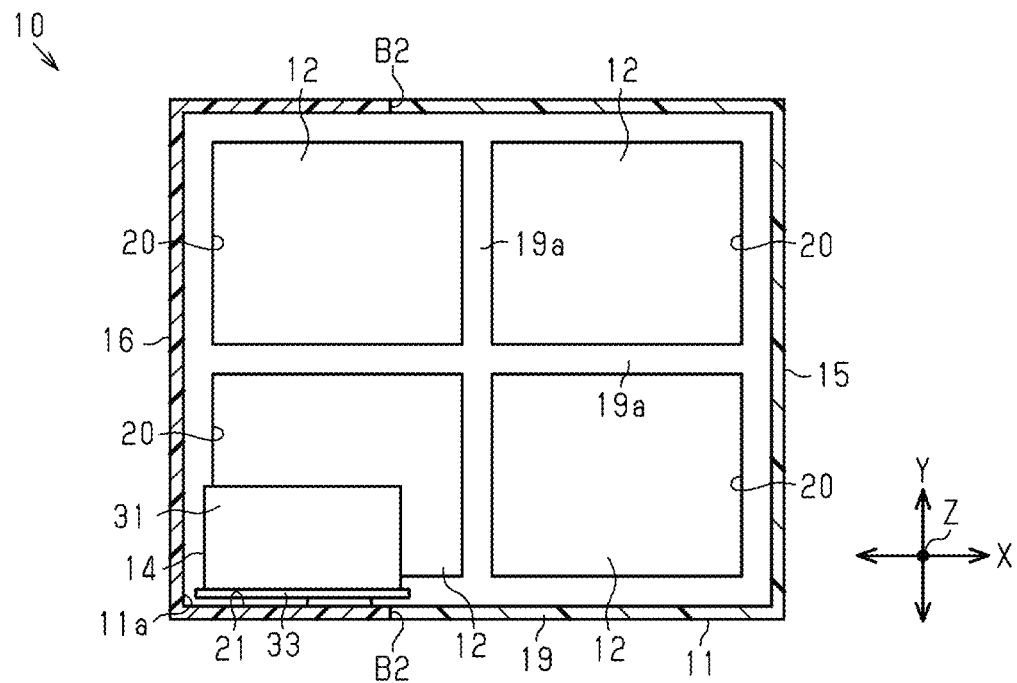
FIG. 2 is a schematic cross-sectional view of the electrical junction box according to the embodiment seen in a height direction.

The electrical junction box 10 in the present embodiment shown in FIGS. 1 and 2 is configured as, for example, a fuse box, a relay box, or the like that is interposed between a plurality of piece of electrical equipment and a power source such as a battery that are mounted in a vehicle, and supplies power to the electrical equipments. The electrical junction box 10 is constituted by a box body 11 housing a plurality of electronic components 12 and a plurality of electronic components 13. Also, the electrical junction box 10 includes a housing member 14 for housing the electronic components 13, separately from the box body 11.

An outer frame of the box body 11 is formed by a plurality of divided bodies. The plurality of divided bodies in the present embodiment are constituted by a first divided body 15, a second divided body 16, a third divided body 17, and a fourth divided body 18. The outer frame of the box body 11 is formed by the first to fourth divided bodies 15 to 18 being combined with each other. Furthermore, the first to fourth divided bodies 15 to 18 of the present embodiment are injection-molded articles made of a synthetic resin, for example.

The first divided body 15 includes a tubular outer circumferential wall 19 that opens on both sides in the height direction Z and a plurality of component housing portions 20 that are integrally formed on the inner side of the outer circumferential wall 19.

The component housing portions 20 are partitioned by extending portions 19a that extend from the inner surface of the outer circumferential wall 19. In other words, the component housing portions 20 are not formed separately from the first divided body 15, but are formed integrally with the first divided body 15. The component housing portions 20 each form a hole passing through in the opening direction of the outer circumferential wall 19, that is, the height direction Z. Each component housing portion 20 houses an electronic component 12. Note that the electronic components 12 in the present embodiment are, for example, a fuse module, a relay module, a connector component, or the like.

The second divided body 16 and the third divided body 17 are attached to one side of the first divided body 15 in the height direction Z, and the fourth divided body 18 is attached to another side in the height direction Z of the first divided body 15. Note that, hereinafter, for illustrative reasons, descriptions may be given assuming the second divided body 16 side and the third divided body 17 side in the height direction Z of the electrical junction box 10 as downward, and the fourth divided body 18 side in the height direction Z as upward. However, this does not necessarily mean that the box body 11 will be mounted in the vehicle with the fourth divided body 18 side facing upward in the vertical direction.

The second divided body 16 and the third divided body 17 form a cover for covering an opening 19b on the lower side of the outer circumferential wall 19. The fourth divided body 18 forms a cover for covering an opening 19c on the upper side of the outer circumferential walls 19.

A fixing portion 22 to which the housing member 14 for housing the electronic components 13 is fixed is integrally formed with a fixing surface 21 set in a portion of the inner surface of the second divided body 16. Note that the electronic components 13 housed in the housing member 14 in the present embodiment are so-called splice parts. Each splice part has a terminal (not shown) that is in contact with a plurality of wires W connected to the splice part.

Furthermore, as shown in FIG. 1, the wires W connected to the electronic components 13 are led out to the outside of the box body 11 through a tubular wire outlet 23 formed in the box body 11. Note that, wires (not shown) connected to the component housing portions 20 of the first divided body 15 are also led out to the outside of the box body 11 through the wire outlet 23. Also, the wire outlet 23 is formed by a portion of the second divided body 16 and a portion of the third divided body 17.

Configuration of Housing Member 14

Figure 3:
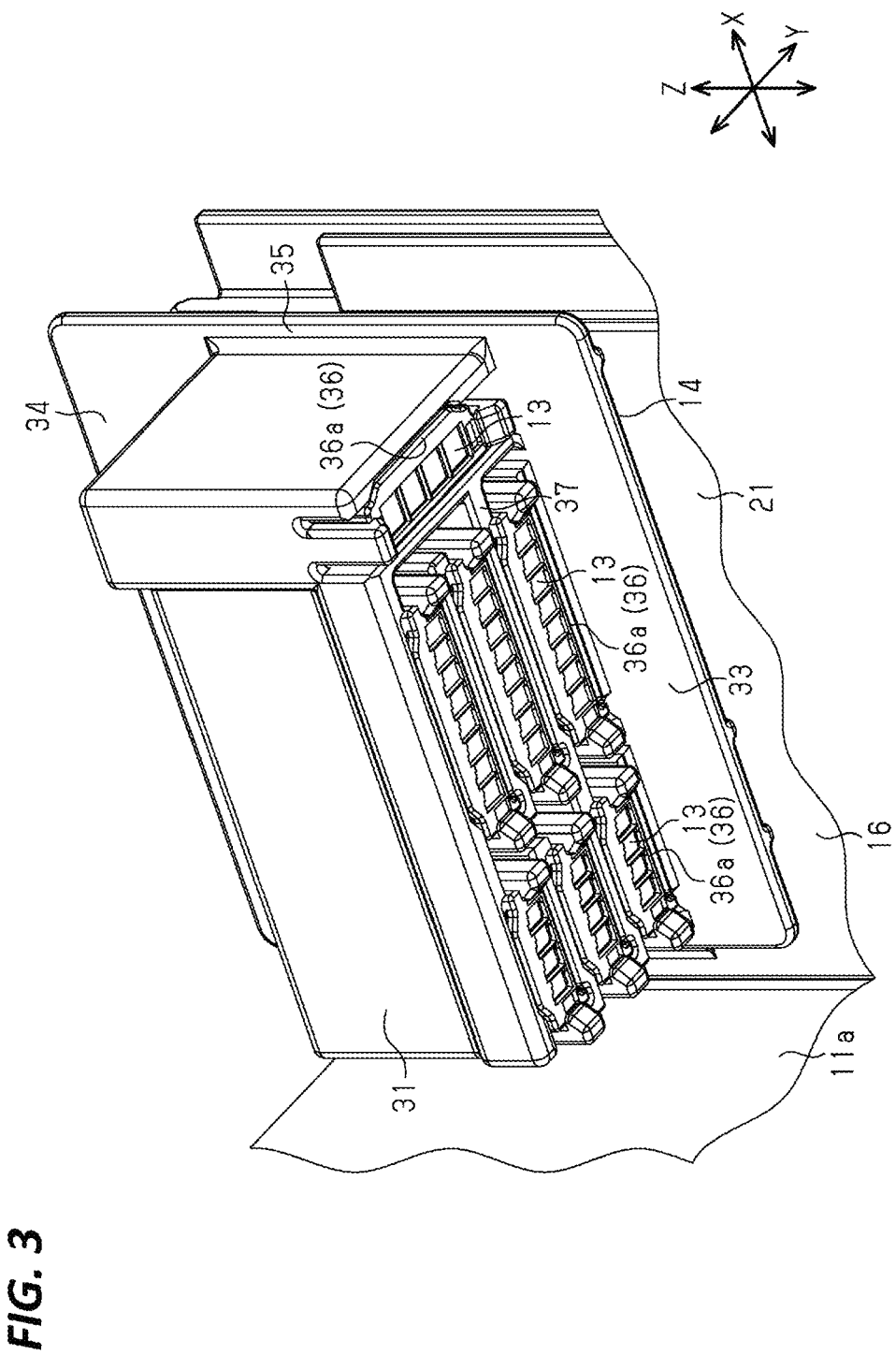
FIG. 3 is a perspective view of a periphery of a housing member according to the embodiment.
Figure 4:
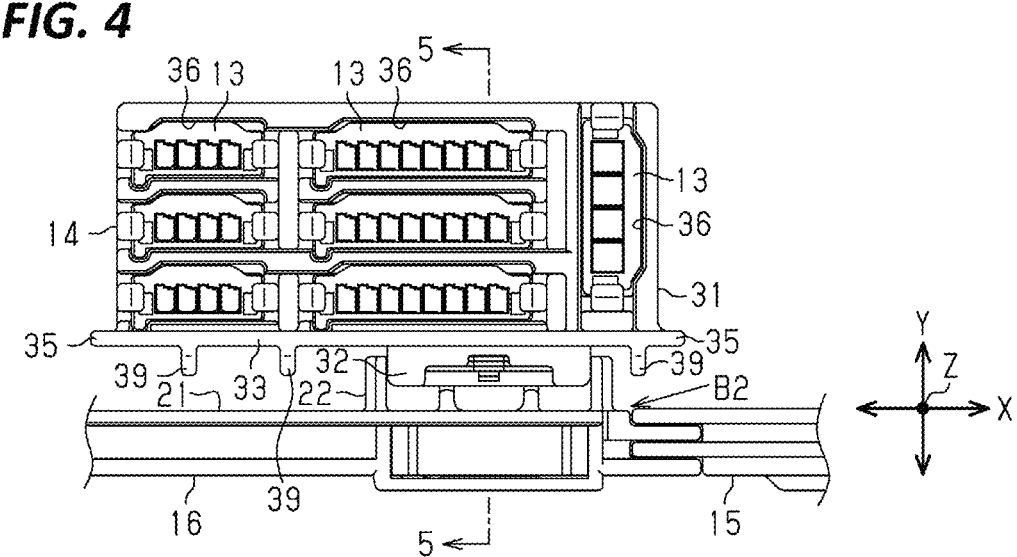
FIG. 4 is a plan view of a periphery of the housing member according to the embodiment.
Figure 5:
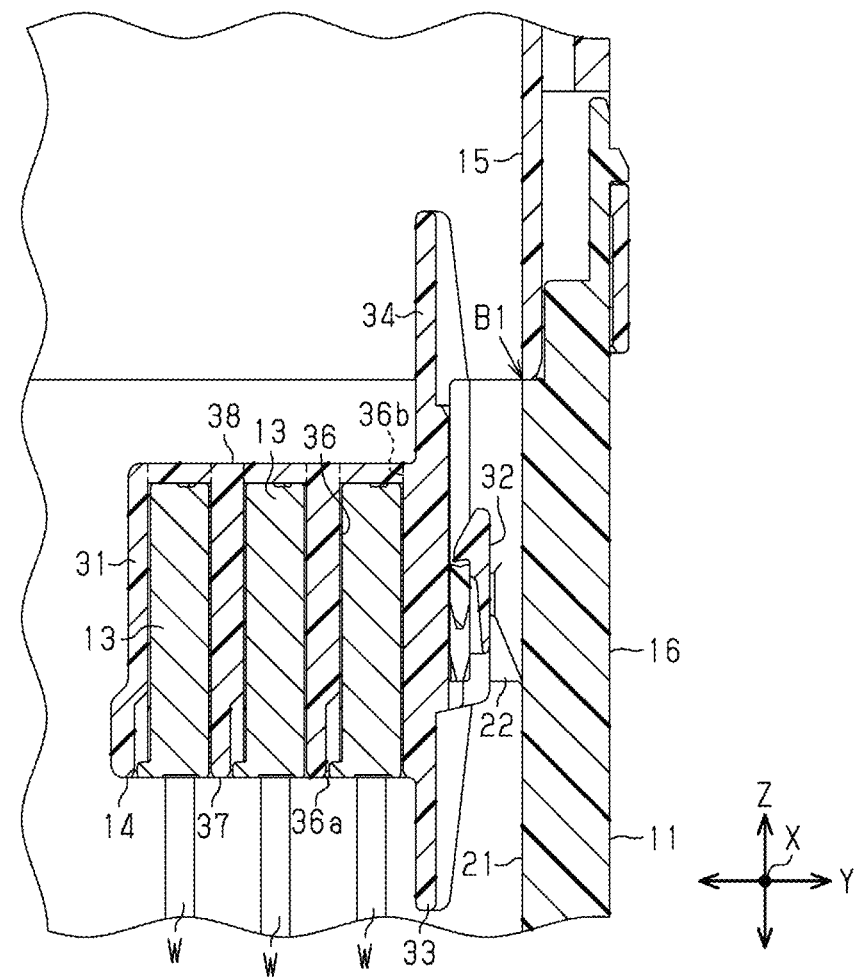
FIG. 5 is a cross-sectional view taken along line 5-5 in FIG. 4.

The housing member 14 is an injection-molded article made of a synthetic resin. As shown in FIGS. 3 to 5, the housing member 14 is provided with a housing body 31, a fixed portion 32 that is fixed to the box body 11 side (of the housing member 14), a first extended wall portion 33, a second extended wall portion 34, and a pair of side extended wall portions 35.

The housing body 31 is approximately rectangular-shaped as seen in the height direction Z. The fixed portion 32 is integrally formed with one side surface of the housing body 31 in the width direction. Note that, in the present embodiment, the attachment posture of the housing member 14 is set such that the width direction of the housing body 31 and the width direction Y of the electrical junction box 10 corresponds to each other, however, the present invention is not particularly limited to this configuration. The fixed portion 32 of the housing member 14 is engaged and fixed to the fixing portion 22 on the box body 11 side by a snap-fit structure, for example.

The housing body 31 includes a plurality of component housing portions 36. The component housing portions 36 each form a hole passing through the housing body 31 in the height direction Z. Each component housing portion 36 is a space for housing an electronic component 13. The lower surface of the housing body 31 in the height direction Z forms a wire lead-out surface 37 through which the wires W connected to the electronic components 13 housed in the component housing portions 36 are led out.

As shown in FIG. 5, the component housing portions 36 each have a first opening portion 36a that opens in a wire lead-out surface 37 at the end portion in the height direction Z. The component housing portions 36 each have a second opening portion 36b at the end portion on the opposite side to the first opening portion 36a. The second opening portion 36b opens in a side surface 38 on the opposite side to the wire lead-out surface 37 in the housing body 31. The opening directions of the first opening portion 36a and the second opening portion 36b are opposite to each other. Note that, the housing member 14 of the present embodiment is configured such that the wires W are not guided out from the side surface 38 that opposes the component housing portions 20 of the first divided body 15 in the height direction Z.

As shown in FIGS. 3 and 5, in the state where the housing member 14 is fixed to the fixing surface 21, the first extended wall portion 33, the second extended wall portion 34, and the side extended wall portions 35 are located on the fixing surface 21 side relative to the component housing portions 36. The first extended wall portion 33 extends downward below the wire lead-out surface 37 in the opening direction of the first opening portion 36a. The second extended wall portion 34 extends upward above the side surface 38 on the opposite side to the wire lead-out surface 37 in the opening direction of the second opening portion 36b.

As shown in FIGS. 3 and 4, the side extended wall portions 35 extend outward relative to the outer surface of the housing body 31 in a direction along the fixing surface 21 that is orthogonal to the opening direction of the first opening portions 36a, in other words, the front-rear direction X. The first extended wall portion 33, the second extended wall portion 34, the side extended wall portions 35, and one side wall of the housing body 31 in the width direction Y are formed in the same plane. Also, ribs 39 protrude in the height direction Z on both sides of the fixed portion 32 of the housing member 14.

As shown in FIG. 1, the boundary between the outer circumferential wall 19 of the first divided body 15 and the second divided body 16 includes a boundary B1 approximately extending in the front-rear direction X and a boundary B2 approximately extending in the height direction Z.

As shown in FIGS. 1 and 5, the second extended wall portion 34 overlaps the boundary B1 as seen in the width direction Y. Also, as shown in FIGS. 1 and 4, one side extended wall portion 35 overlaps the boundary B2 as seen in the width direction Y.

The housing body 31 of the housing member 14 opposes some electronic components 12 along the opening direction of the component housing portions 20 of the first divided body 15, that is, the height direction Z. In other words, the housing body 31 and some electronic components 12 are arranged side by side in the height direction Z.

The operation of the present embodiment will be described.

If the box body 11 comes in contact with water, there is a risk that water will penetrate into the box body 11 through the boundary between the first divided body 15 and the second divided body 16. At this time, depending on the water pressure acting on the box body 11, water may disperse in the box body 11 toward the housing member 14 through the boundaries B1 and B2 between the first divided body 15 and the second divided body 16, the boundary B3 between the second divided body 16 and the third divided body 17 that is located below the housing member 14, and the like. At this time, the first extended wall portion 33, the second extended wall portion 34, and the side extended wall portions 35 make it possible to inhibit water from dispersing toward the housing body 31.

The effects of the present embodiment will be described.

(1) The first extended wall portion 33 makes it possible to inhibit water that has penetrated into the box body 11 from penetrating into the component housing portions 36 of the housing member 14 through the first opening portion 36a. Accordingly, it is possible to inhibit water from contacting the electronic components 13 housed in the component housing portions 36 of the housing member 14.

(2) The component housing portions 36 include the second opening portion 36b that opens in the side surface 38 on the opposite side to the wire lead-out surface 37 of the housing member 14. The housing member 14 includes the second extended wall portion 34 that is located on the fixing surface 21 side relative to the component housing portions 36 and that extends to the side of the second opening portion 36b in the opening direction thereof relative to the side surface 38. With this configuration, the second extended wall portion 34 makes it possible to inhibit water that has penetrated into the box body 11 from penetrating into the component housing portions 36 of the housing member 14 through the second opening portion 36b. Accordingly, also in the configuration in which the component housing portions 36 also open on the opposite side to the wire lead-out surface 37 as described in the present embodiment, it is possible to inhibit water from contacting the electronic components 13 housed in the component housing portion 36 of the housing member 14.

(3) The second extended wall portion 34 overlaps the boundary B1 between the first divided body 15 and the second divided body 16 as seen in the width direction Y. With this configuration, it is possible to favorably inhibit water that has penetrated into the box body 11 through the boundary B1 from penetrating into the component housing portion 36, and as a result, it is possible to inhibit water from contacting the electronic components 13 housed in the component housing portion 36. Note that it is sufficient that the second extended wall portion 34 overlaps the boundary B1 as seen in the width direction Y, and the second extended wall portion 34 may be spaced apart from the boundary B1 in the width direction Y.

(4) The housing member 14 is provided with the side extended wall portions 35 that are located on the fixing surface 21 side relative to the component housing portions 36, and extend outward relative to the outer surface of the housing member 14 in a direction that is along the fixing surface 21 and orthogonal to the opening direction of the component housing portions 36. With this configuration, the side extended wall portions 35 make it possible to more favorably inhibit water from contacting the electronic components 13 housed in the component housing portions 36.

(5) The electrical junction box 10 is provided with the electronic components 12 housed in the component housing portions 20 that are different from the component housing portions 36 in the box body 11. It is preferable that the housing member 14 and the component housing portions 20 oppose each other in the opening direction of the component housing portions 20, that is, the height direction Z. With this configuration, compared to a case in which the housing member 14 and the component housing portions 20 are arranged in an XY planar direction that is orthogonal to the opening direction of the component housing portions 20, it is possible to reduce the size of the box body 11 in the XY planar direction. As a result, it is possible to increase the number of the electronic components 12, 13 that are mounted, while suppressing an increase in size of the box body 11 in the XY planar direction.

Also, in the present embodiment, since the housing member 14 is fixed to the fixing surface 21 set on a portion of the inner surface of the box body 11, it is possible to arrange the housing member 14 toward the edge of the inner space of the box body 11. Accordingly, a configuration is possible in which the wires extending from the electronic components 12 to the wire outlet 23 are not likely to interfere with the housing member 14, while disposing the housing member 14 on the wire outlet side of the electronic components 12 housed in the component housing portions 20 of the first divided body 15.

(6) Furthermore, the housing member 14 is disposed in a corner portion 11a within the box body 11, in other words, in the present embodiment, in one of the four corners of the box body 11. Accordingly, the wires extending from the electronic components 12 toward the wire outlet 23 are less likely to interfere with the housing member 14.

The present embodiment can be implemented by being modified as follows. The present embodiment and the modification example described below can be implemented by being combined with each other as long as no technical contradictions arise.

The dividing structure of the box body 11 is not limited to the first to fourth divided bodies 15 to 18 in the above-described embodiment, and can be changed as appropriate.

In the present embodiment, the housing member 14 and the component housing portions 20 of the first divided body 15 are arranged side by side in the height direction Z, however, the configuration is not limited to this, and a configuration is also possible in which the housing member 14 and the component housing portions 20 of the first divided body 15 are arranged side by side in the front-rear direction X or the width direction Y.

At least one of the second extended wall portion 34 and the side extended wall portions 35 may be omitted in accordance with the configuration of the divided body of the box body 11, the configuration of the component housing portions 36 of the housing member 14, and the like.

A configuration is also possible in which the first extended wall portion 33 overlaps the boundary B3 between the second divided body 16 and the third divided body 17 as seen in the width direction Y. Furthermore, the second extended wall portion 34 need not necessarily overlap the boundary B1 between the first divided body 15 and the second divided body 16.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. An electrical junction box comprising:
a box body;
a housing member fixed to a fixing surface that is set on a portion of an inner surface of the box body; and
an electronic component that is housed in the housing member and to which a wire is to be connected, wherein
the housing member includes:
a wire lead-out surface from which the wire connected to the electronic component is to be led out;
a component housing portion that is a space for housing the electronic component and that includes an opening portion that opens in the wire lead-out surface; and
an extended wall portion that is located on the fixing surface side relative to the component housing portion and extends to a side of the opening portion in an opening direction thereof relative to the wire lead-out surface,
wherein the extended wall portion of the housing member is a first extended wall portion,
the opening portion of the component housing portion is a first opening portion,
the component housing portion includes a second opening portion that opens in a side surface that is on an opposite side to the wire lead-out surface of the housing member, and
the housing member is provided with a second extended wall portion that is located on the fixing surface side relative to the component housing portion and extends to a side of the second opening portion in an opening direction thereof relative to the side surface.

2. The electrical junction box according to claim 1, wherein
an outer frame of the box body is constituted of a plurality of divided bodies, and
at least one of the first extended wall portion and the second extended wall portion overlaps a boundary between the divided bodies.

3. The electrical junction box according to claim 1, wherein
the housing member is provided with a side extended wall portion that is located on the fixing surface side relative to the component housing portion and extends outward relative to the outer surface of the housing member in a direction that is along the fixing surface and orthogonal to the opening direction of the opening portion on the wire lead-out surface side.

4. The electrical junction box according to claim 1, wherein
the electronic component housed in the housing member is a first electronic component,
the electrical junction box comprises:
a second electronic component housed in a second component housing portion that is different from the component housing portion in the box body, and the housing member and the second component housing portion oppose each other in a direction along an opening direction of the second component housing portion.

5. An electrical junction box comprising:
a box body;
a housing member fixed to a fixing surface that is set on a portion of an inner surface of the box body; and
an electronic component that is housed in the housing member and to which a wire is to be connected, wherein
the housing member includes:
a wire lead-out surface from which the wire connected to the electronic component is to be led out;
a component housing portion that is a space for housing the electronic component and that includes an opening portion that opens in the wire lead-out surface; and
an extended wall portion that is located on the fixing surface side relative to the component housing portion and extends to a side of the opening portion in an opening direction thereof relative to the wire lead-out surface,
wherein the housing member is provided with a side extended wall portion that is located on the fixing surface side relative to the component housing portion and extends outward relative to the outer surface of the housing member in a direction that is along the fixing surface and orthogonal to the opening direction of the opening portion on the wire lead-out surface side.

6. The electrical junction box according to claim 5, wherein
the electronic component housed in the housing member is a first electronic component,
the electrical junction box comprises:
a second electronic component housed in a second component housing portion that is different from the component housing portion in the box body, and
the housing member and the second component housing portion oppose each other in a direction along an opening direction of the second component housing portion.

7. An electrical junction box, comprising:
a box body;
a housing member fixed to a fixing surface that is set on a portion of an inner surface of the box body; and
an electronic component that is housed in the housing member and to which a wire is to be connected, wherein the housing member includes:
a wire lead-out surface from which the wire connected to the electronic component is to be led out;
a component housing portion that is a space for housing the electronic component and that includes a first opening portion that opens in the wire lead-out surface; and
a first extended wall portion that is located on the fixing surface side relative to the component housing portion and extends to a side of the opening portion in an opening direction thereof relative to the wire lead-out surface,
wherein an outer frame of the box body is constituted of a plurality of divided bodies, and
the first extended wall portion overlaps the boundary between the divided bodies.

8. The electrical junction box according to claim 7, wherein
the component housing portion includes a second opening portion that opens in a side surface that is on an opposite side to the wire lead-out surface of the housing member, and
the housing member is provided with a second extended wall portion that is located on the fixing surface side relative to the component housing portion and extends to a side of the second opening portion in an opening direction thereof relative to the side surface.

9. The electrical junction box according to claim 7, wherein
the housing member is provided with a side extended wall portion that is located on the fixing surface side relative to the component housing portion and extends outward relative to the outer surface of the housing member in a direction that is along the fixing surface and orthogonal to the opening direction of the first opening portion on the wire lead-out surface side.

10. The electrical junction box according to claim 7, wherein
the electronic component housed in the housing member is a first electronic component,
the electrical junction box comprises:
a second electronic component housed in a second component housing portion that is different from the component housing portion in the box body, and
the housing member and the second component housing portion oppose each other in a direction along an opening direction of the second component housing portion.

* * * * *